Jan. 22, 1952    J. F. HAINES    2,583,172
PROPELLER PITCH CONTROL
Original Filed Oct. 12, 1942    2 SHEETS—SHEET 1
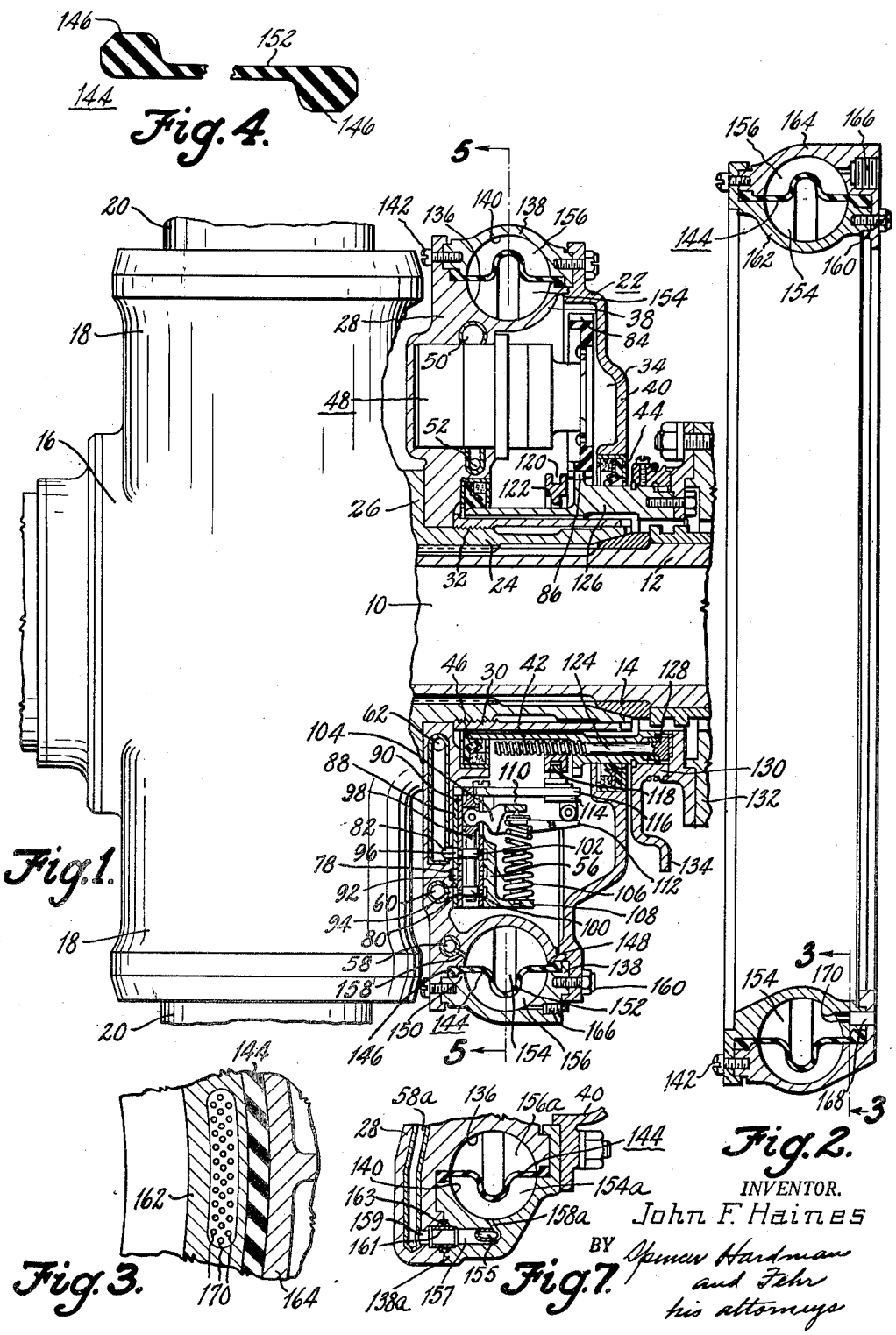
INVENTOR.
John F. Haines
BY Spencer Hardman
and Fehr
his attorneys Jan. 22, 1952     J. F. HAINES     2,583,172
PROPELLER PITCH CONTROL Original Filed Oct. 12, 1942     2 SHEETS—SHEET 2

INVENTOR.
John F. Haines

Patented Jan. 22, 1952

2,583,172

UNITED STATES PATENT OFFICE 2,583,172

PROPELLER PITCH CONTROL

John F. Haines, Dayton, Ohio, assignor to General Motors Corporation, Detroit, Mich., a corporation of Delaware Original application October 12, 1942, Serial No. 461,686, now Patent No. 2,424,749, dated July 29, 1947. Divided and this application October 24, 1946, Serial No. 705,317

10 Claims. (Cl. 60—52)

This invention relates to controllable pitch propellers in which a fluid medium under pressure is led to control apparatus that respond to predetermined conditions for effecting a prescribed control of the propelling apparatus, this application being a division of Ser. No. 461,686, filed October 12, 1942, and which has become U. S. Patent 2,424,749 of July 29, 1947.

One object of the invention is to provide a fluid control system with means for storing a reserve of fluid pressure to be available during substantial rest of the controlled apparatus.

Another object of the invention is to provide a fluid control system with an accumulator that may be carried with movable mechanism and provide a reserve of energy so as to be constantly available for exercising its potential under any condition of the apparatus.

A further object is to provide an accumulator of toroidal form that can be mounted on and rotate with rotating control apparatus.

A further object of the invention is to provide a propeller control mechanism with a self-contained fluid circuit including an accumulator rotating with the propeller and for storing energy for supplying power for feathering the blades of the propeller, and all without making fluid connections to an outside supply.

A further object is to provide an accumulator and control valve assembly for applying the reserve of power from the accumulator when the pressure inducing means in inactive.

Another object is to provide a control valve for a fluid actuating circuit that is characterized by means permitting a build up of pressure in the supply line to a preselected value, and then operating automatically to unload the system, yet retaining the stored pressure for use at a subsequent time.

Yet another object of the invention is to provide a valve unit for control of a fluid circuit by the dominance of either accumulated pressure in the system, or the action of centrifugal force in opposition to the accumulated pressure.

Still another object is to provide a pressure limiting means responsive to the dominance of centrifugal force or accumulated pressure in marking the maximum of pressure built up in the system.

A further object is to provide a self contained fluid circuit for a controllable pitch propeller, with a reserve of fluid pressure for accomplishing supplementary control of the blades during relative inaction of the propeller.

Another object is to provide an accumulator by cooperation of parts of the regulator housing and a ring member to make use of a circumscribing annular chamber adapted to rotate with the regulator.

Further objects and advantages of the present invention will be apparent from the following description, reference being had to the accompanying drawings wherein preferred embodiments of the present invention are clearly shown.

In the drawings:

Fig. 1 is an elevational view of a controllable pitch propeller mechanism with parts shown in section to illustrate the relation of parts of the control units, the section being a view substantially as indicated by the line and arrows 1—1 of Fig. 5.

Fig. 2 is a cross sectional view of an accumulator, of modified form, adapted for attachment to a standard regulator.

Fig. 3 is a fragmentary view in section illustrating features of accumulator connection substantially as indicated by the line and arrows 3—3 of Fig. 2.

Fig. 4 is a sectional view, enlarged, of the deformable partition for the accumulator.

Fig. 7 is a modification of fluid connection to accumulator.

Figure 5:
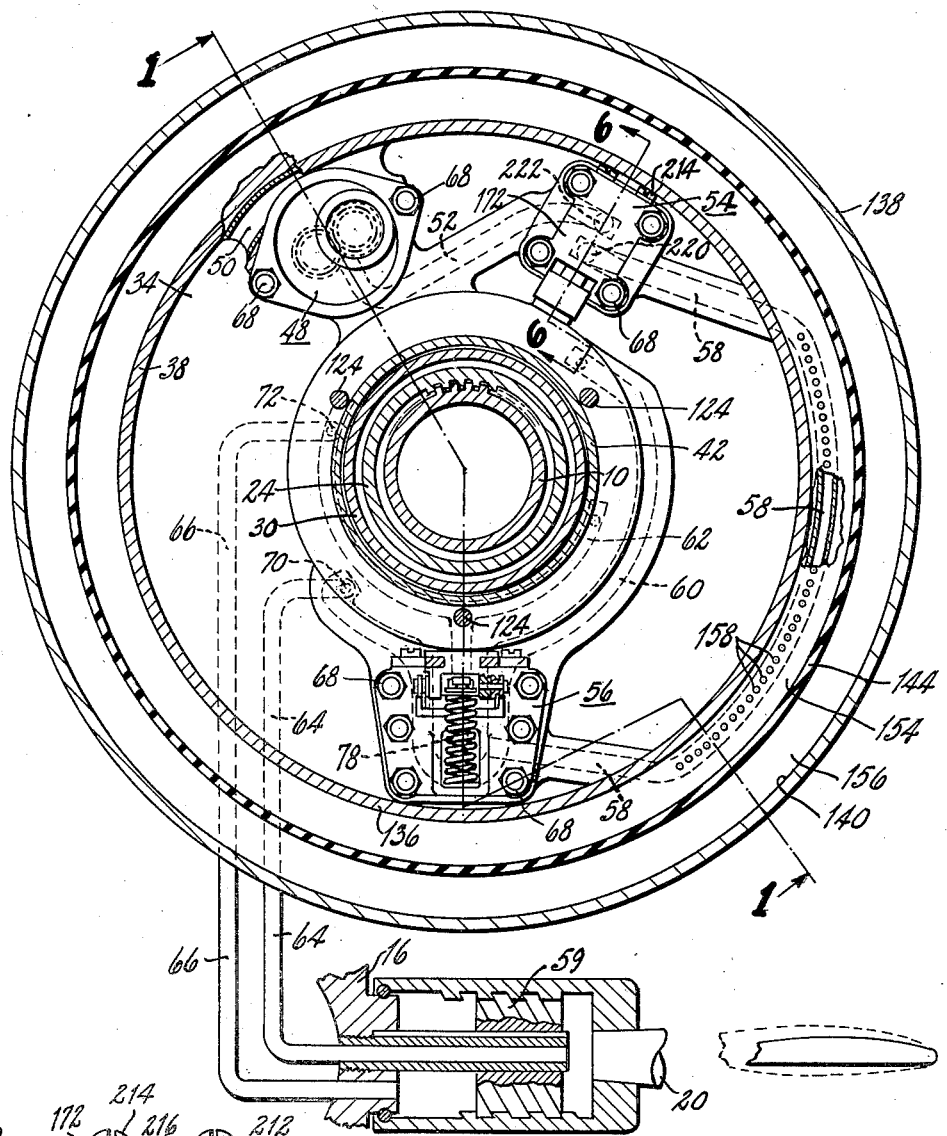
Fig. 5 is a sectional view transverse of the regulator substantially as indicated by the line and arrows 5—5 of Fig. 1, showing the relation of the parts and the fluid circuit connecting them.

With reference particularly to the drawings, 10 indicates a propeller shaft having a shoulder 12 against which is seated a rear cone 14 adapted to take the thrust of a shaft nut in securing thereon a propeller hub 16. The hub provides a desired number of sockets 18 in each of which is pivotally mounted a blade 20 whose pitch setting is effected by a torque applying unit located in the blade root and controlled by fluid actuated means located in a regulator 22 mounted on the propeller hub for rotation therewith. In accomplishing this, the hub 16 provides a rearwardly extending sleeve 24 surrounding the shaft and providing a shoulder 26. The regulator comprises an annular plate 28 surrounding the sleeve and seated against the shoulder 26 where it is secured by means of a sleeve nut 30 threaded upon the hub extension at 32.

The plate 28 forms one wall of a reservoir for enclosing fluid pressure control mechanism and connecting means to form a self contained and unitary assembly. The reservoir, designated by the numeral 34, is completed by a circumscribing wall 38, an annular plate member 40, and an adapter sleeve 42 the latter of which is fixedly supported from outside of the reservoir. The sleeve 42 extends through the plate or cover 40 to bridge the space between it and the plate 28 where it has a more or less socketed engagement, and engages fluid seals 44 at the cover 40, and 46 at the plate 28.

The seals 44 and 46 comprise flexible rings carried by ledges of the plate and cover and have a flexible portion normally in running contact with the sleeve 42, but are adapted under rotation of the regulator to lift off or reduce pressure upon the sleeve 42 so as to reduce friction and wear of the seals. Under a state of rest they engage the sleeve 42 firm enough to prevent fluid flow from the reservoir. While rotating, any liquid contained in the reservoir is cast outwardly against the peripheral wall 38 at which time the seals do not need to be tight against the adapter sleeve.

The fluid charge of the reservoir 34 immerses a substantial portion of each of the units of the control mechanism enclosed within the reservoir and mounted on the plate 28, where they make fluid connection with integrally formed passages. The control mechanism includes a pump or pressure developing unit 48 that has an intake 50 from the reservoir and discharges into a pressure supply passage 52 leading to a pressure limiting valve unit 54, later to be described, and thence to a governor or distributor valve unit 56 by way of a passage 58. From the distributor valve unit the fluid under pressure is led to either side of a torque applying unit 59 (see Fig. 5) in the root of the blade, which leading is accomplished by one or another of the control passages 60 or 62, and transfer tubes 64 and 66.

In a preferred form the tubular passages connecting the various control units are in the form of bent tubes designed and placed so as to connect properly to and from the desired stations where the units are to be placed, and then are cast as inserts in the body of the supporting plate. Drillings properly located in the casting and opening into the tubes make it feasible for connection of the various units by the clamp-on method, where they may be secured by screw devices 68 and the like. Drillings 70 and 72 from the outside of the plate 28 make for reception of the ends of the transfer tubes 64 and 66 when the plate is assembled with the sleeve extension 24 of the hub. Drillings 74 and 76 from the inside face of the plate facilitate connection with the valve unit 54, and drillings 78, 80 and 82 afford proper connection of the governor valve unit with the supply passage 58 and the control passages 60 and 62 respectively.

The pressure creating means 48, that is selected for illustration here, is of the intermeshing gear type or one in which a source of fluid under pressure is delivered so long as the gears are under rotation. The pump is driven by means of a spur gear 84 meshing with a fixed gear 86 formed as a flange on the stationary adapter sleeve 42. Since the gear and sleeve are rigidly supported from the outside, and since the regulator rotates about the sleeve, the pump is caused to revolve about the gear 86 which causes rotation of the pump elements and draws in fluid at 50 from the reservoir and pushes it along the passage 52 to the valve unit 54. From the valve unit, to be described in detail later, the fluid under pressure flows through the passage 58 to the drilling 78 where it encounters the governor valve unit 56.

The governor valve unit comprises a chamber block 88 having a porting sleeve 90 with ports 92, 94 and 96 adapted to coincide with the drillings 78, 80 and 82 respectively. A valve plunger 98 slides along the porting sleeve and has lands 100 and 102 spaced for closing off the ports 94 and 96 when the valve is in the mid or equilibrium position. The valve plunger attains and retains its equilibrium position in response to centrifugal force applied to the valve plunger and an actuating lever 104 pivotally connected thereto, and opposed by substantially constant force of a spring 106. The valve plunger is disposed radially of the axis of propeller rotation and tends to move radially outward in response to centrifugal force applied to the valve and its actuating lever. The spring is supported by a ledge 108 extending from the block 88 and engages the intermediate part 110 of the lever. As a relatively fixed support of the lever there is a movable fulcrum 112 provided by a movable carriage 114 that slides on guides 116 fixed with respect to the block 88. Movement of the carriage 114 along the guides varies the point at which the end of the lever 104 will rock about the fulcrum and thus changes the relation and the magnitude of the centrifugal force arm and the spring force arm. That change sets up a new or different speed level at which the governor valve will control or assume an equilibrium position.

In order to have selective control of the speed level, or in order to move the fulcrum to a desired position, the carriage is provided with a shoe 118 that follows along a groove 120 of a control ring 122 surrounding and movable along the fixed adapter sleeve 42. For the movement of the control ring there are a plurality of screw shafts 124 threaded into the ring and journalled in a thickened portion 126 of the sleeve 42. The screw shafts extend aft of the adapter sleeve to provide pinions 128 that mesh with a ring gear 130 rotatable in a groove between the sleeve 42 and an attaching plate 132 by which the adapter sleeve is retained against rotation. A lever 134 extending from the ring gear 130 provides for manual movement thereof which causes the screw shafts to rotate in unison and thread into and out of the control ring 122, that in turn sliding along the adapter sleeve and thus moving the fulcrum 112 toward and away from the point of spring pressure.

The pressure supply passage 58 on its way from the valve unit 54 to the governor valve unit 56, communicates with an accumulator in which may be stored fluid pressure for smoothing the operation of the control units, and for providing a reserve of pressure available at times when the fluid pressure developing means is inactive. The regulator housing is designed to provide part of the accumulator structure, in that the peripheral wall 38 is grooved peripherially and exteriorly to provide a channel 136 semicircular in cross section surrounding the regulator. A cover ring 138 having an internal groove 140 of similar but complementary semicircular cross section telescopically engages over the peripheral wall 38 where it is held in sealing relation by screw devices 142. A deformable partition 144 is disposed between the members 38 and 138 where it is anchored against displacement by thickened rims 146 lodged behind fins 148 and 150 of the members 38 and 138 respectively.

That structure normally provides an annular passage of circular cross section at the outer bounds of the regulator and substantially concentric with the axis of propeller rotation. The partition member 144 has a width between the rims 146 far in excess of the diameter of the circular passage so that when anchored between the members 38 and 138 the intermediate or spanning portion 152 will buckle or bulge to one side. The member 144 thereby divides the annular passage into two chambers, 154 and 156. The chamber 156 may be termed a loading chamber since it is radially outward of the deformable partition and may enclose a volume of air under pressure, or some inert gas. The chamber 154 may be termed a pressure chamber since openings 158 extend from the groove 136 into the pressure passage 58. The cover plate 40, for the reservoir, may be secured to the aft rim of the ring member 138 by screw devices 160.

To improve the stability of the pressure chamber, it may be desirable, to locate the air or loading chamber inward of the pressure chamber as is shown in Fig. 7, where the grooves 136 and 140 separated by the deformable wall 144 provide the loading chamber 156a inward of the pressure chamber 154a. The ring member 138a provides a cast in passage 155 into which a plurality of small openings 158a lead from the pressure chamber 154a. Aligned drillings 157 and 159 make communication between 155 and the passage 58a, while a nipple 161 and sealing ring 163 make a fluid tight joint between the plate 28 and ring 138a. In this construction, the pressure chamber 154a is radially outward where the mass of fluid medium will not be cast against the partition 144 purely by reason of centrifugal force of rotation.

As the fluid in the system develops pressure it flows into the pressure chamber 154 from the passage 58 to compress the loading gas in the chamber 156. That chamber always being under inflation will constantly exert a force upon the fluid content of the chamber 154 tending to drive it outward through the openings 158, whereby a reserve of fluid pressure is had even though the pressure developing means 48 is inactive, or insufficiently active to deliver fluid under pressure to the fluid circuit. To insure that the loading of the partition member 144 will not cause rupture of the partition when it is forced against the opposing wall of the pressure chamber 154, the openings 158 leading to the pressure passage 58 are desirably small and many as shown in the drawings. Though the size of the openings is small the number are sufficient to make up an equivalent area of openings that will not materially increase the resistance to fluid flow.

In the form of structure shown in Figs. 1 and 7, the accumulator is of the built-in type but may as well be embodied in an attached or accessory structure somewhat as shown in Figs. 2 and 3. There the accumulator structure comprises a pair of telescopically engaging rings 162 and 164 assembled with the partition member 144 to form the loading chamber 156 and the pressure chamber 154. As such a structure, it is insertable between the plate 28 and cover 40 of the regulator, or is adapted to be attached thereto in any convenient manner. In this form the chamber 156 is loaded with air or gas under pressure through an opening 166 similar to the preferred form and in which is secured a valve of the pneumatic tire type. Similarly, a recess 168 in the body of the ring 162 is bottomed with apertures 170 that communicate with the pressure chamber 154, and from which, it is understood, fluid connection is led to the pressure supply passage 58 in the usual manner.

The pressure limiting valve unit 54 is inserted in the fluid path between the pressure developing means 48 and the accumulator, with an object to effect the charge or storing of pressure in the accumulator during operation of the pump, to prevent return flow of fluid under pressure from the accumulator, and to unload the pressure developing means when its delivery reaches a selected pressure value. The valve unit comprises a self-contained unit adapted to be connected into the fluid circuit by the clamp-on method, and comprises a housing member 172 providing a well 174 and a through bore 176. The bore 176 is so formed in the housing as to be radially disposed when the housing is mounted on the plate 28, and is enlarged at the inboard end 178. The smaller bore 176 has intermediate its length an undercut 180, and the juncture of the large and small bore has an undercut 182. A piston valve 184 is disposed mainly in the bore 176 and is of sufficient length to cover the undercut 180. An enlarged portion 186 lapped into the bore 178 provides a differential or fractional area exposed to the undercut 182, from which a bore 188 leads into the well 174. Attached to the piston valve 184 there is a weight member 190 that has a pin 192 passing through the valve piston and ends in a spaced head 194, that permits relative movement between the weight and piston. A spring 196 enclosed thereby normally tends to separate the weight and piston, so that the piston valve moves outwardly against the juncture of the two diameters of the bore to cover the undercut 180, and so that the weight moves inwardly to rest against a stop 198 attached to the housing by screw devices as 200. The well 174 houses a check valve assembly including a cup 202 whose bottom wall is apertured at 204 and supports a pin 206 that retains and guides a disc valve 208 under the urge of a spring 210 resting against the bottom of the well. The valve assembly is held in place by a cover plate 212 and screw devices 214, and tends to divide the well 174 into a delivery chamber 216 and a pressure chamber 218, into which the bore 188 from the undercut 182 empties. A drilling 220 opens the pressure chamber 218 to the drilling 76 communicating with the pressure passage 58, while drilling 222 connects the drilling 74 with the delivery chamber 216, and the drilling 224 connects the delivery chamber with the undercut 180.

Figure 6:
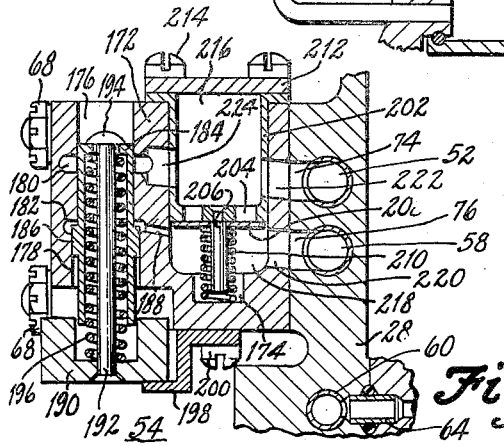
Fig. 6 is an enlarged sectional view of the valve unit, it being a view substantially as indicated by the line and arrows 6—6 of Fig. 5.

The valve unit operates as follows. It is unique in that it operates with snap action under influence of centrifugal force, and also acts with a graduated effect below critical speed and pressure. In one instance, it performs a pump unloading function, and in another instance it performs a pressure limiting function. During rotation starting from rest, the valve ports will be related as shown in Fig. 6 where the weight and valve member will be separated and the weight 190 will be urged radially inwardly against the stop 198 by the spring 196 which also pushes the piston 184 outwardly of the stepped bore to close the undercut 180. With the propeller rotating, the pump 48 revolves about the gear 86 which causes rotation of the pump gears to take in fluid from the reservoir through the intake 50 and deliver the fluid under pressure to the passage 52, by which it empties into the delivery chamber 216 through drillings 74 and 222. Fluid under pressure in the delivery chamber 216 flows past the disc valve 208 and into the pressure chamber 218. Thence, by way of the drillings 220 and 76, and the passage 58 the fluid under pressure flows to the governor valve port 92, on its way engaging the holes 158, 158a or 170 leading to the pressure chamber 154 of the accumulator. Assuming that all outlets from the governor valve unit are closed, then the pressure in the pressure passage 58 and in the accumulator chamber 154 will build up to a predetermined value, in so doing compressing the gas in the loading chamber 156. That developed pressure is restrained from returning to the pump by the check valve element 208, but the pressure chamber 218 is communicated to the fractional area of the piston 184 by reason of the drillway 188 and the undercut 182.

At low speeds of rotation, such as those less than required to throw the weight 190 outward by centrifugal force, inward movement of the piston valve 184 is opposed only by the force of the spring 196 and centrifugal force on the member 184, wherefore the piston valve readily moves inward to unload the pump through the drilling 224 and undercut 180, whenever the fluid pressure in the accumulator and pressure chamber has developed to a predetermined value. That pressure of the accumulator and pressure chamber operates through the drilling 188 and upon the fractional area of the piston valve to move it against the spring 196. Thus, the pump is unloaded to the reservoir through 224, 180 and 176, but the accumulated pressure is maintained. During continued rotation of the propeller, the weight member 190 moves from a position of rest against the stop 198, radially outward as the speed of rotation increases. Under those conditions, inward movement of the piston valve is now opposed by both an additional force of the spring 196 (under compression) and centrifugal force acting on the member 184 and the weight member 190, which steps up the magnitude of the force opposing inward movement of the piston valve to open the delivery chamber to the reservoir. The movement of the valve when so coupled with the weight 190 is of the snap action type, since the weight in moving inward or outward changes the effect of centrifugal force thereon, but does not change the opposing force of fluid pressure upon the fractional area of the piston. The disturbance of balanced forces on the valve is sufficient to move the valve and weight quickly from one extreme position to the other. When the accumulating pressure starts to move the piston valve inward it has a magnitude sufficient to overcome the centrifugal force applicable upon the assembly at a certain radial distance from the axis of rotation, and the inward movement of the weight 190 shortens the moment arm through which centrifugal force acts, thus decreasing the effect of centrifugal force even though the speed of rotation is unchanged. The accumulator pressure remaining unchanged has an even greater advantage over the opposing centrifugal force and moves the valve and weight assembly inward more rapidly.

Thus, under normal propeller rotation above a predetermined speed, the valve piston 184 is normally urged to close the undercut 180, by reason of the centrifugal force acting upon the valve and weight. While the valve and weight are in this collapsed relation, and at the outboard limit of their movement, they are subject to radial inward movement in response to stored-up pressure in the pressure chamber of the accumulator. That pressure operating from the pressure chamber 218 and through the drill way 188 is applied to the fractional area of the piston valve which, when it becomes great enough, causes the valve to snap radially inward against the opposing forces to a position against the stop 198, so that the undercut 180 is completely uncovered. When that occurs, the high pressure limit of the fluid circuit connected with the accumulator is attained, since the fluid under pressure within the delivery chamber 216 may then exhaust through the drilling 224, undercut 180 and bore 176 back into the reservoir 34, instead of passing the valve 208 into the pressure chamber 218.

The valve unit 54 therefore operates to effect charging of the accumulator with fluid under pressure, but prevents the pressure developed from forcing the liquid back through the pump should its delivery fall off. The pressure developed in the accumulator is kept available until made use of through operation of the governor valve either automatically or manually. On the other hand, should the pressure in the system reach a predetermined high value the valve unit returns all fluid that might result in a higher pressure to the reservoir.

The pressure developed in the accumulator is always available at the intermediate port 92 of the governor valve unit, and should there be an overspeed condition, the valve plunger 98 in moving radially outward operates to connect that port with the port 94 leading to the control passage 60 and thence through transfer passage 64 to one side of the torque applying unit for increasing the blade pitch. On the other hand, should there be an underspeed condition, then the valve plunger moves inwardly to connect the port 92 and 96 which in a similar way admits fluid under pressure through passages 62 and 66 to the opposite side of the torque applying unit which tends to decrease the pitch of the blade. That control of the blade shift is wholly automatic and tends to control the operation of the propeller at a substantially constant speed, the level of which may be determined by the setting of the fulcrum 112 through the selected position of the lever 134.

Aside from the shift of the blade pitch, by automatic means, it may be necessary or desirable to movably change the pitch setting to a feathered position and back again to a working range. If an engine fails or stops, the blades of the propeller, unless moved to a particular position, will by reason of the windmill action, cause the engine to continue to turn over, and perhaps cause damage. In the present instance, the manual control of the fulcrum 112 may be actuated to such a position that the fulcrum is on the opposite side of the line of spring force, in which instance the valve plunger is cast radially outward calling for an increased pitch change of the blade. Under those conditions there is no developed resisting force on the valve plunger and the stored up pressure of the accumulator operates to move the blades to the feathered or non windmilling pitch position illustrated by dotted lines in Fig. 5. Subsequently, if it is desirable, the fulcrum of the governor valve may be moved aft toward the end of the lever 104 where the forces of the spring on the lever will be reversed to cause the valve plunger 98 now to be forced inwardly to connect port 92 and 96. The remaining stored up pressure of the accumulator will now be available to effect sufficient pitch change in the blades to bring them out of the feathered position to a working position shown by full lines in Fig. 5, and allow them to windmill, which may be availed of to crank the engine.

While the embodiments of the present invention as hereindisclosed, constitute preferred forms, it is to be understood that other forms might be adopted, all coming within the scope of the claims which follow.

What is claimed is as follows:

1. In a system having a fluid circuit for controlling a hydraulically operated device, a valve unit mounted on a rotatable support and connected for controlling said fluid circuit, comprising in combination, a body having a pair of cylindrical parallelly arranged bores, one of which bores is radially disposed with respect to the axis of rotation of the rotatable support and is reduced in diameter to open outward at opposite sides of the body, cross passages opening into both bores, a stepped piston slidable along the reduced diameter bore and acting as a valve to close off one of said cross passages when in a radially outward position, a weight member yieldably supported by the piston and responsive to centrifugal force of support rotation for urging the piston to close the valved cross-passage, and means for exposing a fractional portion of the piston valve area through the other cross passage to pressure in the fluid circuit for opposing the action of the weight member and tending to open the said valve cross-passage.

2. A centrifugally operated valve unit for limiting the pressure of a system, comprising in combination, a block mounted on a rotatable support, said block having a bore in which is disposed a valved partition providing a delivery chamber and a pressure chamber, and said body having a stepped bore of two diameters joined by a shoulder, the axis of said stepped bore being arranged radially of the rotatable support with the smaller bore opening outward, means providing fluid connection between the delivery chamber and the small diameter of the bore, and means constantly connecting the pressure chamber and the large diameter at the shoulder of the stepped bore, stepped piston means movable along the stepped bore and having a fractional area exposed to the pressure at the shoulder of the bore and adapted to stop fluid flow from the delivery chamber to the small diameter bore, and a loosely coupled weight member carried by the piston and responsive to rotation of the support for urging the piston to the said fluid stop position, the pressure of said pressure chamber opposing the action of said weight member and tending to move said piston for opening fluid flow from the delivery chamber.

3. In a system for controlling the pitch of propeller blades by a hydraulically operated device, a valve assembly unit, comprising in combination, a casing providing a delivery chamber and a pressure chamber, a check valve preventing return fluid flow from the pressure chamber to the delivery chamber, said casing having a through passage of differential diameter, a passage connecting the smaller diameter with the delivery chamber, a passage connecting the larger diameter with the pressure chamber, a stepped piston slidable along the passage of differential diameter and having a fraction of its area exposed to the pressure of the pressure chamber, said piston being operative to control fluid flow from the delivery chamber to the smaller diameter, and means opposing movement of the piston in response to pressure on the fractional area for maintaining the passage from the delivery chamber to the smaller bore closed.

4. A valve unit of the class described, and mounted on a rotatable structure for controlling a fluid circuit, comprising in combination, a chambered body having radially disposed bores providing a pressure source port, a pressure line port connected with a motor device, and a pressure unloading port constantly communicating with the source port, valve means operable to permit fluid flow from the source port to the pressure line port but prevent return flow, a piston valve in one of the radial bores with spring means for normally closing the pressure unloading port, and having a fractional area constantly exposed to the pressure at the line port tending to open said unloading port, and a centrifugally responsive mass operable upon the spring means for increasing the opposition to force applied to the fractional area of said piston in accordance with the speed of structure rotation.

5. The combination set forth in claim 4 wherein the piston valve normally closes the unloading port under the urge of the spring means that gradually increases with the speed of support rotation until a predetermined speed is reached and means afforded by the centrifugally responsive mass in forming an abutment for said spring means for snapping the piston valve to open unloading port position at the said predetermined speed, said spring and centrifugal mass thence being opposed by accumulator pressure to restrain from closing the unloading port until a substantially lower speed than the said predetermined speed is reached.

6. The combination set forth in claim 4 wherein the spring means tends to move the piston valve to a closed unloading port position with increasing force as the speed of support rotation increases, and at a predetermined speed of rotation the piston valve being responsive only to the force exerted by said centrifugal mass.

7. The combination set forth in claim 4 wherein the piston valve is disposed for movement radially of the axis of support rotation, and in which the spring means yieldingly couples the centrifugal responsive mass to the piston valve such that the radially outward movement of the centrifugal responsive mass against the force of the spring means picks up the piston valve and thence the piston valve acts with a snap action at and above a predetermined speed of support rotation.

8. In a system for controlling the position of a movable member on a rotatable device by means of fluid pressure supplied to a motor element through a check valve, a rotatable support carried by the rotatable device, a pump and a distributor valve carried by the support for supplying the fluid pressure and distributing that pressure to the motor element, a pump unloader valve carried by the rotatable support and comprising a stepped bore and stepped piston arranged radially of the rotatable support, passage means connecting the pump side of the check valve with the stepped bore to provide a pump unloading port, passage means connecting the motor side of the check valve with the differential diameter of the bore and piston, a centrifugally responsive weight carried by the stepped piston tending to move the piston in such direction as to close the pump unloading port, a compressible spring yieldably coupling the weight to the stepped piston and operable to shorten the assembled length of weight and piston in response to increase of centrifugal force, and radially outward movement of the piston for closing of the unloader port being opposed by the pressure at the differential area of the piston from the motor side of the check valve, and domination of the pressure at the differential area over the centrifugal and spring force effecting radially inward movement of the piston and weight for quickly opening the unloading port.

9. In a system for controlling the position of a movable member on a rotatable device by means of fluid pressure supplied to a motor element through a check valve, a support rotated by the device, a pump on the support for supplying fluid under pressure to the check valve and thence to the motor element, a pump unloader valve for by-passing the discharge of the pump away from the motor when the fluid pressure on the motor side of the check valve reaches a predetermined value, said unloader valve comprising in combination a step-bored cylinder arranged radially of the rotatable support, passage means connecting the pump side of the check valve with an unloading port near the radially outward end of the cylinder, passage means connecting the motor side of the check valve with the shoulder between the step bores of the cylinder, a piston with cooperating portions fitting the stepped bore of the cylinder and slidable therein under the urge of centrifugal force to close the unloading port, a loosely coupled weight assisting the piston movement in closing said port, spring means disposed between the piston and weight for modifying the action of centrifugal force on the weight and piston couple, the slidable movement of the piston and weight couple for closing the unloader port being constantly opposed by the fluid pressure on the motor side of the check valve applied to the step of the cylinder and piston, and slight domination of pressure forces on the step of piston and cylinder over the centrifugal force and spring force on the piston and weight couple effecting a snap action movement of the piston and weight couple to a radially inward position opening the unloading port due to the altered centrifugal effect without a change in speed of support rotation.

10. A valve assembly for insertion in a fluid pressure line between a constant delivery pump and an intermittently operated fluid pressure motor, comprising in combination, means rotatably supporting the valve assembly and pressure line, a check valve having a pressure input side and a pressure output side, means providing a cylinder having a stepped bore joined by an annular shoulder, the smaller portion of said bore opening to the outside of said line, passage means connecting the pressure input side of the check valve with the smaller portion of the stepped bore to provide an unloader port, passage means connecting the pressure output side of the check valve with the annular shoulder of the stepped bore, a piston having stepped diameters cooperable with the stepped bore for control of the unloader port and closing the larger portion of the stepped bore of the cylinder, spring means engaged by the piston normally urging the piston along the stepped bore so that the piston closes the unloader port, a radially movable weight member carried by the piston and engaged by the spring for assisting the spring means in closing the unloader port while the valve is rotating, and means whereby the pressure on the output side of the check valve is constantly applied to the stepped diameter of the piston for opposing the combined forces of the spring and the weight in closing the unloader port.

JOHN F. HAINES.

REFERENCES CITED

The following references are of record in the file of this patent:

UNITED STATES PATENTS

| Number | Name | Date |
|---|---|---|
| 1,636,561 | Hazard | July 19, 1927 |
| 2,264,375 | Hill | Dec. 2, 1941 |
| 2,307,102 | Blanchard et al. | Jan. 5, 1943 |
| 2,417,870 | Haines | May 25, 1947 |
| 2,424,749 | Haines | July 29, 1947 |